(12) United States Patent
Stählin et al.

(10) Patent No.: US 9,800,492 B2
(45) Date of Patent: Oct. 24, 2017

(54) METHOD AND COMMUNICATION SYSTEM FOR DATA RECEPTION IN WIRELESS VEHICLE-TO-SURROUNDINGS COMMUNICATION

(75) Inventors: Ulrich Stählin, Eschborn (DE); Marc Menzel, Weimar (DE); Richard Scherping, Liederbach am Taunus (DE)

(73) Assignee: Continental Automotive GmbH, Hannover (DE)

( * ) Notice: Subject to any disclaimer, the term of this patent is extended or adjusted under 35 U.S.C. 154(b) by 290 days.

(21) Appl. No.: 14/232,182

(22) PCT Filed: Jun. 29, 2012

(86) PCT No.: PCT/EP2012/062682
§ 371 (c)(1),
(2), (4) Date: Jan. 10, 2014

(87) PCT Pub. No.: WO2013/007536
PCT Pub. Date: Jan. 17, 2013

(65) Prior Publication Data
US 2014/0140353 A1    May 22, 2014

(30) Foreign Application Priority Data

Jul. 12, 2011  (DE) .......................... 10 2011 107 111

(51) Int. Cl.
*H04L 12/725* (2013.01)
*H04L 29/08* (2006.01)
*H04L 12/717* (2013.01)
*B60W 50/00* (2006.01)

(52) U.S. Cl.
CPC .......... *H04L 45/3065* (2013.01); *H04L 45/42* (2013.01); *H04L 67/12* (2013.01); *H04L 67/322* (2013.01); *H04L 67/327* (2013.01); *B60W 2050/0043* (2013.01); *B60W 2550/408* (2013.01)

(58) Field of Classification Search
USPC .......................... 701/1, 41, 70, 117, 119, 300
See application file for complete search history.

(56) References Cited

U.S. PATENT DOCUMENTS

| 6,496,770 | B2 | 12/2002 | Winner et al. |
| 7,908,059 | B2 | 3/2011 | Bullinger et al. |
| 8,520,695 | B1 * | 8/2013 | Rubin ...................... G08G 9/02 370/337 |

(Continued)

FOREIGN PATENT DOCUMENTS

| DE | 10 015 300 | 10/2001 |
| DE | 10 2007 058192 | 6/2009 |

(Continued)

*Primary Examiner* — Truc M Do
(74) *Attorney, Agent, or Firm* — Cozen O'Connor (57) ABSTRACT

A communication system of a vehicle receives data in wireless vehicle-to-surroundings. The communication system includes multiple control devices. A receiving control device receives data from objects located in the surroundings of the vehicle, and a communication stack is processed during reception. In order for the data to be expediently and effectively acquired, the received data is sorted into at least two classes of relevance and is further processed in the communication stack according to the class of relevance.

16 Claims, 3 Drawing Sheets

(56) References Cited

U.S. PATENT DOCUMENTS

| | | | |
|---|---|---|---|
| 8,547,249 B2 | 10/2013 | David et al. | |
| 8,666,645 B2* | 3/2014 | Saunders | G08G 1/0133 701/117 |
| 9,679,480 B2* | 6/2017 | Hakeem | G08G 1/052 |
| 2003/0139881 A1* | 7/2003 | Miller | B60R 21/013 701/301 |
| 2004/0230345 A1* | 11/2004 | Tzamaloukas | G01C 21/26 701/1 |
| 2004/0230374 A1* | 11/2004 | Tzamaloukas | G01C 21/28 701/495 |
| 2010/0098297 A1* | 4/2010 | Zhang | B60W 30/09 382/104 |
| 2010/0164752 A1* | 7/2010 | Stahlin | G08G 1/096716 340/905 |
| 2010/0209881 A1* | 8/2010 | Lin | G09B 19/167 434/65 |
| 2010/0209885 A1* | 8/2010 | Chin | G09B 19/167 434/65 |
| 2011/0095906 A1* | 4/2011 | Stahlin | G08G 1/095 340/905 |
| 2011/0190972 A1* | 8/2011 | Timmons | G01C 21/34 701/31.4 |
| 2011/0215758 A1* | 9/2011 | Stahlin | G07C 5/008 320/109 |
| 2012/0143977 A1* | 6/2012 | Miche | H04L 67/12 709/207 |
| 2012/0197873 A1* | 8/2012 | Uramoto | H04W 4/021 707/722 |
| 2012/0327840 A1* | 12/2012 | Chen | G08G 1/163 370/315 |
| 2014/0143834 A1* | 5/2014 | Stahlin | H04L 67/12 726/3 |
| 2014/0145861 A1* | 5/2014 | Goudy | G08G 1/163 340/905 |

FOREIGN PATENT DOCUMENTS

| | | |
|---|---|---|
| DE | 10 2008 049824 | 4/2010 |
| DE | 10 2010002092 | 12/2010 |
| JP | 2007-156756 | 6/2007 |
| WO | WO 2006/015747 A1 | 2/2006 |
| WO | WO 2010/130737 A1 | 11/2010 |

* cited by examiner

METHOD AND COMMUNICATION SYSTEM FOR DATA RECEPTION IN WIRELESS VEHICLE-TO-SURROUNDINGS COMMUNICATION

CROSS-REFERENCE TO RELATED APPLICATIONS

This is a U.S. national stage of application No. PCT/EP2012/062682, filed on 29 Jun. 2012, which claims priority to the German Application No. 10 2011 107 111.7, filed 12 Jul. 2011, the content of both incorporated herein by reference.

BACKGROUND OF THE INVENTION

1. Field of the Invention

The invention relates to a method for data reception in wireless vehicle-to-surroundings communication (C2X), in particular mobile vehicle-to-surroundings communication or vehicle-to-vehicle communication (C2C) as a special case of C2X communication, in a communication system of a vehicle with a plurality of control devices in which a receiving control device receives data from objects from the surroundings of the vehicle and in which, during the reception of the data, in at least one control device, but preferably in a plurality of control devices of the vehicle, a communication stack is processed, and also a correspondingly configured communication system of the vehicle.

2. Related Art

A vehicle communication system of this type usually consists of a plurality of control devices which perform different functions. In the vehicle, the data physically received by one or more antennas with one or more allocated receivers (or combined transmitters and receivers) are further processed by the one control device or the plurality of control devices of the communication system. Typically, one of the control devices, which is also referred to in the context of this application as a receiving control device, will contain the transmitting and receiving part and parts of the communication stack to be processed, which will be explained in somewhat more detail below. At least one control device is then provided for the actual application, for example a driver assistance function. Further parts of the communication stack, for example with the facility layer, may also be located in still further, different control devices of the vehicle.

The reception process and the tasks of the control devices performed therein are controlled by the so-called communication stack. The C2X communication stack or the associated C2X communication protocol describes, with reference to the OSI model, the tasks which are performed in mobile C2X communication. This communication stack is largely standardized in Europe by an industry cooperation of the C2C Communication Consortium (C2C-CC) and the ETSI and/or the CEN. In the USA, the standardization is carried out by e.g. IEEE, SAE, etc. The tasks to be carried out by the communication stack may, in particular, be the (physical) data reception, the routing of the data, the processing of the data between the reception and the application or the provision of data in the vehicle. These tasks are performed according to the specifications in different layers of the OSI model.

In C2X communication, data are exchanged between the vehicle (C) and objects in its surroundings (X). The objects in the surroundings may be permanently installed transmitting units by the side of the road, referred to as Road Side Units (RSU), other vehicles participating in the traffic or standing idle, or pedestrians equipped with corresponding transmitters and/or receivers. The exchanged data perform different functions, for example a protection, warning and/or information function, and can also be used by a driver assistance system.

In C2X communication, depending on the traffic density or density of transmitters participating in the C2X communication, the exchange of large data volumes may occur, so that the bandwidth available in the physical radio band for the communication is heavily loaded. It is known that bandwidth is a limiting factor in the transmission and/or reception of data. Exhaustive use of the bandwidth can result in time delays to the point of a breakdown of the communication network. However, in the case of the safety-related applications of the mobile C2X communication, the data exchange can be extremely time-critical, since the traffic situation of a moving vehicle, where appropriate, changes quickly and a warning is intended to be given in good time before a dangerous situation. At the same time, the dangerous situation itself often changes also. It is therefore necessary for the communication system of a vehicle to record and further process the information exchanged in the C2X communication quickly. The volume of information represents a major problem here.

US 2003/0139881 A1 shows a method for operating a pre-crash sensing system for a vehicle by means of C2X communication, which, following a first check, allows communication with specific objects only. To do this, a pre-crash sensing system determines the proximity or distance between the one own vehicle and the other vehicle serving as a possible communication partner. If the vehicles are located in their mutual field of view, a key is exchanged and communication is started. As a result, only vehicles which could potentially represent a danger to one another communicate with one another. The data volume is thereby reduced compared with a communication solution in which all vehicles in a predefined surrounding area would communicate with one another. However, it is disadvantageous that, due to the checking of a hazardous situation and subsequent key exchange, the communication becomes more complex and the establishment of communication takes longer. In the case of a critical situation, this can result in problematic delays. This type of establishment of communication also results in an increase in the exchanged data volume, particularly also in time-critical dangerous situations. This partially cancels out the described advantage in the selection of information and can, for its part, result in time delays.

WO 2006/015747 A1 shows a preventive protective system with which the features from the multiplicity of input variables of the safety sensor system relevant to the safety of the motor vehicle are filtered out. The preventive protective system of the motor vehicle acts preventively in that the safety sensor system is controlled depending on preselected features. It is proposed, for example, to allocate a specific weighting, in terms of criticality, to features indicating a frontal impact. This system accordingly describes a specific filtering for a specific dangerous situation. However, no distinction is made here as to whether a danger could or could not arise at all from a detected object. Moreover, the features must be defined in advance, so that this case is not appropriately applicable to a complex and variable C2X communication with many different participants.

In mobile C2X communication, extremely large data volumes can occur, which must be processed quickly and completely, as they are otherwise worthless. There is the additional hindrance that not every control device of the communication system can process all data. In particular, safety-related data should only be processed by control devices which have a low probability of failure. The probability of failure is indicated here by the so-called ASI level, which is defined in detail in ISO 26262.

SUMMARY OF THE INVENTION

The object of the invention is to propose a possibility for recording the received data expediently and effectively.

According to a first aspect of the present invention, the data received in the vehicle are sorted into at least two different classes of relevance and processed in the communication stack depending on the class of relevance. The dependence can, in particular, consist in that data from different classes of relevance are further processed differently. As a result, the potentially large volume of received data is preprocessed so that not all elements of the processing chain in the communication stack are burdened with unnecessary, i.e. irrelevant, data.

Since not every type of processing of data is allowed in any given control device, because, for example, specific safety-related data can be processed only in control devices with the corresponding safety level, it is proposed according to an aspect of the invention to distribute the proposed preprocessing in particular among different control devices also, wherein, between the different steps of the preprocessing, further parts of the communication stack, preferably the normal communication stack without the preprocessing according to the invention, can also be processed. The check on the relevance of the data received from other objects can essentially be carried out in any control device. The sorting into classes of relevance then decides whether these data are further processed at all, and in what way they are further processed.

It is therefore preferred according to an aspect of the invention to carry out the sorting of the data directly in the control device designed for the reception, wherein this receiving control device can also be, and also normally is, simultaneously designed for the transmission of data. As the relevance check takes place directly in the receiving control device, this can be carried out particularly comprehensively and quickly, since all data from the surroundings are received by the receiving control device and the sorting of the data into classes of relevance is preferably carried out exclusively using the received data. No delay due to a complex communication between the vehicle and its surroundings or due to an elaborate evaluation of the data therefore occurs. In particular, the solution according to the invention requires no multiple transmission and reception between the object and the vehicle, for example to exchange a security key.

The direct sorting of the received data into classes of relevance by the receiving control device allows the available resources to be used effectively, since it is subsequently already possible to process the classes of relevance in the communication stack and, where appropriate, a plurality of downstream control devices in different ways. Thus, for example, the application to which the data are to be forwarded can be determined based on the class of relevance, so that the data processing according to the invention can also be distributed among different control devices. The further processing of the data can therefore take place according to the invention on different control devices, wherein, where appropriate, the same data can also be further processed on different control devices. It is furthermore possible to sort the data into different applications according to the class of relevance.

Similarly, it is thus possible to remove data and therefore prevent downstream parts of the communication stack from being burdened with unnecessary data, since the processing time for relevant data can also be significantly reduced through the removal of irrelevant data.

In a particularly simple embodiment, only two classes of relevance, i.e. relevant and irrelevant, can be provided, wherein only the data sorted into the "relevant" class of relevance are further processed and the other received data are rejected.

According to one aspect of the invention, the interval or distance between the object and the vehicle can be selected as the criterion for the division into the class of relevance. This is, for example, simply possible because the data telegrams exchanged in the C2X communication contain a position indication of the transmitter, for example in the coordinates of a predefined coordinate system such as a satellite-based location system. This information is therefore available immediately following the reception of the data telegram.

The location and position information of the own vehicle is often present in the receiver or the control device directly allocated to it (receiving control device), since this receiving control device, for example, also evaluates the satellite data telegrams of a satellite-based location system, and/or because this receiving (and also transmitting) control device allocated to the receiver and transmitter of the vehicle provides the data telegrams of the C2X communication transmitted by the vehicle with the position information also made available to it, where appropriate, in real time and continuously by other control devices. The distance between the objects can be derived simply and quickly from this position information present in the same coordinate system also, wherein the distance simply represents the linear distance between the objects. However, road or direction information does not (yet) need to be taken into account here, even if this is essentially already possible, in particular for the own vehicle.

In a further aspect, the sorting into the classes of relevance takes place alternatively or additionally, using a collision time allocated to the data received in the vehicle in the receiving control device. The distance (for example in relation to the linear distance or the actual instantaneous movement direction) and the relative speed between the object and the vehicle, can be used in a simple manner to determine the collision time, also referred to as the "time-to-collision" or TTC for short. The relative speed indicates how quickly the object from which the data are first transmitted is moving in relation to the receiver of the data. Alternatively, it would also be possible, based on the location and speed of the own vehicle and of the object, to define collision ranges which supply their maximum range in a predefined time-to-collision. If overlaps in these collision ranges occur, the time-to-collision is understepped.

In a further aspect of the method according to the invention, the sorting of the received data from objects is carried out on the basis of the overlap with the coverage area of one or more environment sensors of the vehicle. It may thus be appropriate, for example, to divide data of this type into a class of relevance that allows a dynamic prediction of the data in order to support and/or speed up the evaluation by the environment sensor.

According to a further aspect of the present invention, a priority can be allocated to a class of relevance. A different priority can preferably be allocated to different classes of relevance. It is also possible to allocate different priorities to data or the associated objects in a class of relevance in the sense of a division according to importance of the data in order to sort the received data according to their importance within a class of relevance also. A high priority is advantageously allocated to data with a short time-to-collision, i.e., a possible potential collision in a short time relative to the current time. These higher-priority data are then given preferential treatment in the further processing of the data in the communication stack or by individual control devices, wherein different priorities can also preferably be allocated to the data from different classes of relevance. The lower-priority data are not neglected or rejected, but processed only with a delay and/or in different ways in the communication stack and/or in different control devices compared with higher-priority data. A further important advantage of the prioritization is that the processing of classes of relevance and/or data with the highest priority can be controlled in such a way that the latter are carried out only in control devices with a corresponding ASI level.

According to an appropriate further aspect of the invention, it can be provided in the method that the quality of the received data is improved by the data of a different object or of a sensor. For this purpose, a validation of the received data or data derived therefrom can preferably be carried out in a next control device downstream of the receiving control device, in particular using additional vehicle data. A filtering out of invalid data and an increase in the reliability of the remaining data can thereby be achieved. To carry this out, the control device or, where appropriate, a plurality of different control devices, can collect and process not only data received from the surroundings in the C2X communication, but also data from vehicle sensors. A sensor data fusion can also be carried out here. In a sensor data fusion, data which are received from different sensors can be linked with one another in order to improve the quality of the data or information through reference to different data sources and sensor sources. This is advantageous, in particular, if the sensors have different modes of operation, since these sensors then normally have different systematic errors, and the total error is then improved through a combination of the different sensor data. Quality of data is understood, in particular, to mean the reliability, accuracy and/or density of the data. It is thus possible, inter alia, to obtain a more precise distance measurement if, for example, a data fusion takes place between the location information from data of the C2X communication and from data of a radar sensor such as the environment sensor located in the vehicle. Different sensors of the vehicle or data already derived therefrom can be used in the sensor data fusion. In particular, data retrievable by other vehicle control devices as information in the vehicle communication system, preferably a bus system, are advantageous here, since they can be picked up simply by each control device in a step of the stepwise preprocessing according to the invention of the received data.

It is similarly possible according to the invention, in a specific step of the preprocessing according to the invention, to carry out a dynamic prediction of objects participating in the C2X communication, i.e., in particular other vehicles. A dynamic prediction involves the prediction of the future data of an object, in particular relative to the particular (receiving) vehicle. An important subsidiary aspect thereof is the determination of the future position data of an object. For this purpose, it is provided to record and subsequently extrapolate the speed and/or position of a vehicle by the mobile C2X communication and/or in a sensor data fusion. Sensor data of the vehicle and data from the mobile C2X communication are generally used here in order to project existing data into the future and thus anticipate a traffic situation.

In a further development of this idea according to the invention, a trajectory of the object can be determined from the data present for the object, and this trajectory can be extrapolated, the extrapolation being based in particular on the data received in the C2X communication, where appropriate incorporating other sensor data. A statement on a future traffic situation is thereby possible. In the case where sufficient time and/or resources, in particular computing time, are available in a control device, an extrapolation is preferably determined using a map and the expected route. The distance information can hereby also be qualitatively improved by distance information adapted to the map.

In road traffic, vehicles are frequently in comparable situations. Thus, for example, vehicles normally travel alongside and behind one another at different speeds in the lanes on highways, wherein greater speed differences normally occur in the passing lanes only if the traffic density is not too high. In the case of higher traffic density, a convoy formation frequently arises with a convoy speed, in particular in the event of congestion or slow-moving traffic. Speeds lower than would be structurally possible, and therefore convoy formation, can also occur in traffic due to weather influences or speed restrictions. The same applies in the case of roadwork. Also in the case of entry and exit slip roads, dividing or merging roads, reduction or expansion on highways, a group of vehicles traveling one behind the other usually reveals a similar movement pattern. It is similarly possible that the vehicles are located at a known, marked traffic location, such as a junction, intersection, railway crossing or traffic lights, on a rural road or in urban traffic.

In such situations, the objects are characterized by homogeneous data, i.e. the data of the different objects are similar or identical. These data are therefore characterized by a low variance around their average, and an individual object can already clearly describe the characteristic of such a group of objects. In such a case, it can be provided according to an aspect of the invention to combine the data from objects, in particular objects within a class of relevance, into groups. All objects in such a group therefore resemble one another in their traffic behavior, so that the data of this group of vehicles can be combined. This is preferably not done in the receiving control device, but in a downstream control device. This method variant is then particularly economical on resources. A reduction of the data volume is therefore carried out according to the invention by combining the different objects into a group or an event to be processed in the data-processing.

A convoy speed, for example, and the length and location of the group can be transferred as important group parameters. The length or extension of the group can, for example, be determined as the total quantity of the positions of the individual objects or as their center point or focal point. The convoy speed can preferably also be formed as the mean value of the speeds of the objects combined in the group. In addition, the object next to the own vehicle can also be transferred as an individual object which will then, for example, also be accessible to a dynamic prediction. Instead of the aforementioned group parameters, the parameters of this next object from the group can also be used as group parameters. In this case, the group could therefore be represented in a simple manner by the objects of the group with the lowest time-to-collision and/or the shortest distance to the own vehicle.

It is furthermore possible to divide up the preprocessing even further and, where appropriate, distribute it among further control devices in order to incorporate further elements, such as a data filtering, a first situation evaluation or the like.

Even if, according to the invention, a different number of classes of relevance is essentially possible, it has proven to be particularly advantageous to divide the received data into three classes of relevance, wherein the division can be carried out, according to the selected criteria, already in the first receiving control device or step-by-step in different receiving control devices. A clear structuring and allocation of different processing steps for the often very broad range of possible received data from different objects can thereby be achieved.

A first class with the highest possible relevance level, a third class with the lowest possible relevance level and a second class with a medium possible relevance level can be formed here. According to an aspect of the invention, the division of classes of relevance is not restricted to three. The second class with a medium possible relevance level is then further divided, wherein, where appropriate, the boundaries to the first and the third class can be shifted. The following explanation does not therefore apply only to the specifically described three classes of relevance, but, according to an aspect of the invention, also to more classes of relevance, wherein the features described for the first and the third class apply in each case to the class of relevance with the highest and lowest possible relevance level. The criteria for the categorization or sorting into the different classes of relevance are suitably adapted in the case of more than three levels. One criterion that is particularly suitable according to the invention for the division into classes of relevance is the time-to-collision, which, where appropriate, can be used in conjunction with further criteria for the sorting into the different classes of relevance.

The first class with the highest relevance level relates to the immediate vehicle surroundings. This can be determined in a specific example of the application of the method according to the invention by the distance between the own vehicle and the object from which the received data in the C2X communication were transmitted. The distance as previously described as the linear distance between the own vehicle and the object therefore defines a radius around the particular own vehicle, within which information from the C2X communication is always categorized as relevant in the preprocessing. The time-to-collision, which takes into account the distance with the speed of the object and/or the relative speed of the object in relation to the particular own vehicle, can also be used as a further criterion for received data. An appropriate limit value for the first class may, for example, be a time-to-collision of two seconds. In the preprocessing, in particular, no further data and information are used according to the invention for the categorization into the class with the highest possible relevance level for the sorting into this class of relevance, and, in particular, no assumptions are also made concerning the road, the route of the object on the road or the driver behavior so as not to delay the processing of these, in some cases time-critical, data due to the preprocessing according to the invention. Where appropriate, it can even be provided according to the invention to further process these data directly and prioritize them in the processing of the communication stack according to their high priority, which is allocated to the data of this first class of relevance. Technically, this can be produced, for example, by an interrupt, which interrupts the normal (serial) processing of the communication stack when the corresponding data in the first class of relevance are present and inserts these data from the first class of relevance, i.e. with the correspondingly highest priority, into the processing of the communication stack or forwards them to the safety control devices.

The second class, with the medium relevance level, relates to relevant objects which may have an influence in the near future on driving behavior and on the safety of the own vehicle, without being directly safety-related. The distance between the vehicle and the objects transmitting the data can be used as a criterion for the categorization into the second class, wherein the radius or distance of the surrounding area formed around the own vehicle is greater than in the case of a sorting into the first class. As a result, a short distance between the vehicle and the object can be defined which, however, exceeds the immediate vehicle surroundings. Furthermore, the time-to-collision, which, for example, is up to five seconds for this class, can be used as a further criterion for the sorting into this class of relevance. All objects of which the time-to-collision with the own vehicle is between two and five seconds are therefore also sorted into this second class of relevance.

In addition, the objects which are still located within the coverage area of the environment sensor system, for example a radar sensor present in the vehicle, can also be included in the sorting, insofar as an environment sensor system of this type is present in the vehicle. Furthermore, data can also be sorted into this second class of relevance on the basis of assumptions relating to the road (highway, junction, rural road, road in built-up areas) and/or assumptions relating to the driving behavior of the own vehicle and/or the object. However, these objects additionally counted to supplement the second class are preferably not formed in the first control device, i.e. the receiving control device, but in a downstream control device.

More distant objects are categorized into the last, in the example described, third class with the lowest possible relevance level. All objects which are not sorted into the other classes of relevance can be categorized into this class of relevance with the lowest priority. The data of these objects can be significantly more intensively evaluated and/or combined in the preprocessing, but preferably in further downstream control devices so as not to overload the vehicle's own assistance systems due to a multiplicity of C2X messages. Particularly in this class of relevance, it is appropriate to combine data of different objects into a group. An example of objects combined in this way may, for example, be group information with the parameters "4 vehicles at position XY, group speed 20 km/h, tailback". No dynamic prediction and/or trajectory are preferably then determined for these objects. However, group data of this type may, where appropriate, be linked to an object from the medium (second) class of relevance which, for example, constitutes the representative of this group nearest to the own vehicle, for which a dynamic prediction or trajectory determination is then possible.

A division of the data into the different classes of relevance is then particularly simply possible if the classes of relevance in each case cover a collision period. Here, it can be provided that the collision period is disjoint. Alternatively, the collision periods in the boundary area between two classes of relevance may also overlap, so that the data in the boundary area belong to two classes of relevance. This enables a redundancy in the data processing and the different processing of the data in different evaluations. In this connection, it is also conceivable that one class of relevance partially or completely contains the data of another class of relevance. A fast response to the data is thereby possible, e.g., by bypassing a dynamic prediction, and the dynamic prediction is carried out in parallel through the preprocessing of the other class of relevance.

Furthermore, according to another aspect, the invention relates to a communication system for data reception in wireless vehicle-to-surroundings communication (C2X) between individual communication participants, wherein the communication system is provided in a vehicle and has different control devices with, preferably in each case, a computing unit. The communication system of the vehicle is configured in particular for participation in wireless vehicle-to-surroundings communication (C2X) and can therefore communicate in particular with other vehicles participating in the C2X communication and stationary participants in C2X communication, known as Road Side Units (RSU). Furthermore, the computing units in the control devices are configured to carry out the previously described method or parts thereof.

The invention also relates accordingly to a computer program product with program code means which are stored or are storable on a computer-readable data medium in order to carry out the method as set forth herein, if the program product is installed and run on a computing unit.

For faster and effective processing of data received in the C2X communication, the present invention proposes to subject these data to a preprocessing which may be divided, in particular, among a plurality of control devices and which runs in parallel with the processing of the normal communication stack, i.e., integrated into or being related to the latter. In that the preprocessing according to the invention is divided among a plurality of positions within the communication stack, the processing of the communication stack can be influenced by the preprocessing and, in particular, individual steps of the preprocessing in order to be able to process quickly and reliably a large volume of receiving data from the C2X communication. For this purpose, it is provided according to an aspect of the invention to divide the data for structuring and/or the objects transmitting data in the preprocessing into different classes of relevance. This sorting into classes of relevance enables, in a simple manner, the data of different objects to be preprocessed differently and to be incorporated into the communication stack according to their class of relevance or to be forwarded to the corresponding destination control devices. The advantageously provided division among a plurality of control devices allows smaller and less conductive control devices to be used, which also do not all have to meet a high safety standard (SIL level).

A preferred criterion for the sorting into classes of relevance, where appropriate in conjunction with further criteria, is the time-to-collision, which, in a simple manner, combines the distance and the speeds or the relative speed between the own vehicle and the object into a possible time-to-collision. This time-to-collision is suitable, in particular, for an initial classification. The receiving range of the environment sensors may be a further criterion according to the invention for the decision concerning the sorting or division of the data into different classes, since data received from the receiving range of the environment sensors can be qualitatively improved according to the invention through a sensor fusion. Depending on the allocated class of relevance and/or priority, which, for example, also enables a sorting of the data or objects within the classes of relevance, the objects or the data of the objects can be divided among different applications. Due to the preprocessing, it is thus possible according to the invention, even at an early reception stage, to divide the different data appropriately and forward them to suitable applications or to the control devices running the applications. It is also possible to make further steps of the preprocessing dependent on the sorting into classes of relevance in a preceding step of the preprocessing.

If sufficient time is available for the processing, i.e. in particular for data of objects which are sorted into a low or the lowest class of relevance, it is also possible, according to an aspect of the invention, to combine a plurality of objects into a group and further process them with group data. Due to the concentration and combination of the individual data into group data, the volume of the data to be processed in the vehicle system is significantly reduced.

BRIEF DESCRIPTION OF THE DRAWINGS

Further advantages, features and possible applications of the present invention can be found in the following description of example embodiments and the drawings. Here, all described and/or graphically presented features individually or in any combination form the subject matter of the present invention, also independently from their combination in claims or their back-references. In the drawings:

DETAILED DESCRIPTION OF THE PRESENTLY PREFERRED EMBODIMENTS

Figure 1:
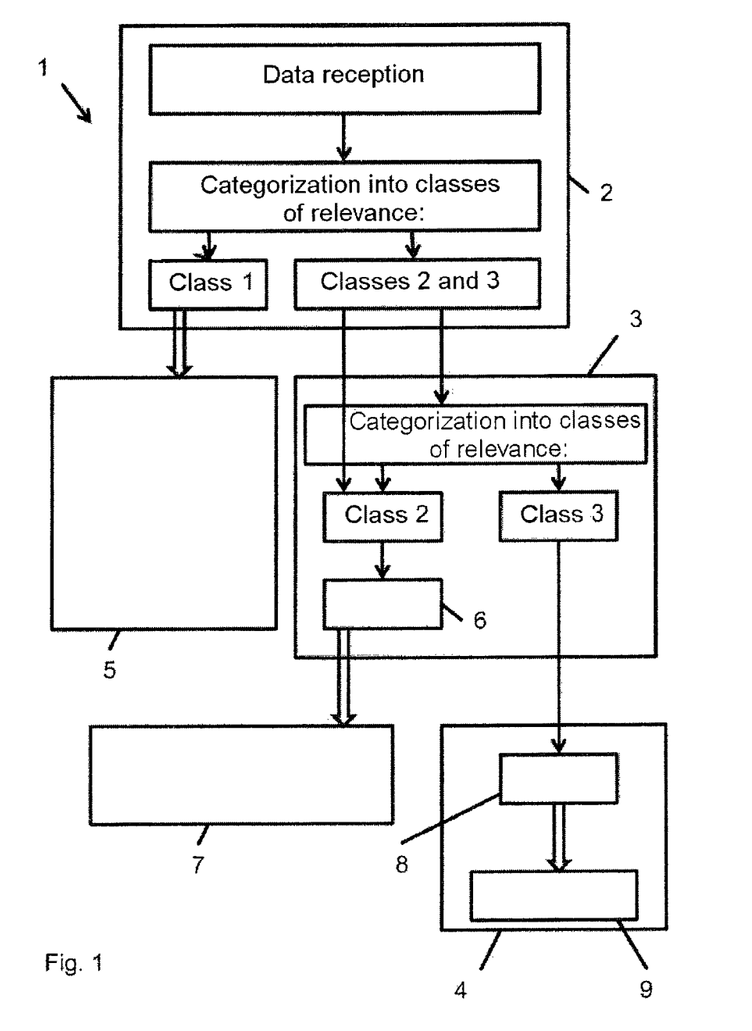
FIG. 1 is a flowchart with the progression of the method according to the invention for data reception in vehicle-to-surroundings communication in a vehicle communication system according to the invention according to a first embodiment.

FIG. 1 shows schematically a communication system 1 of a vehicle with control devices 2, 3 and 4. The control device 2 represents a receiving control device to which the antenna (not shown) with the transmitting and receiving electronics is connected. In the receiving control device 2, the received data are incorporated into the communication stack processing of the communication system 1, which performs the process of the physical decoding of the data received by the antenna through to the processing and transfer of the data to individual applications in application modules 5, 6, 7, 8 and/or 9 according to the specifications of the communication protocol. According to an embodiment of the invention, this communication stack processing operation runs in parallel in the control devices 2, 3, 4 and, where appropriate, the application modules 5, 6, 7, 8, 9 or their computing units (not shown). The control devices 2, 3, 4 and the application modules 5, 6, 7, 8, 9 can also be provided in one unit with a common computing unit.

Following the reception of data, the communication stack processing takes place at least to the extent that the received data are present as digital and therefore further processable values. Subsequently, during the preprocessing according to the invention, a categorization or sorting of the data or transmitting objects into reference classes takes place in the receiving control device 2. For this purpose, the distance between the own vehicle and the object is determined from the position data of the transmitting object, which are contained in the values of the received data, and the position data of the own vehicle, which are known in the receiving control device 2, for example through received signals of satellite-based location information or through a different module via a communication network within the vehicle. Furthermore, a possible time-to-collision is determined via the speed of the own vehicle and the speed of the object. Here, from the distance and the positions of the vehicles and also the direction of the speed, known, for example, through transmission of the individual coordinate components of the speed in the coordinate system used is taken into account.

If the distance and time-to-collision are below predefined threshold values for the first class of relevance 1 with the highest relevance, the data or objects are allocated to the class of relevance 1. If the distance and time-to-collision are above the threshold values for the first class of relevance 1, but below the threshold values for the second class of relevance 2, the data or objects are allocated to the second class of relevance 2. Other objects are allocated to the class of relevance 3 with the lowest relevance or, if it is already certain that they are no longer used, are already rejected here.

The objects in the class of relevance 1 are then further processed with highest priority, since these objects present, where appropriate, a direct risk to the own vehicle. The preprocessing is ended for these objects and the processing of the communication stack is concluded. This is shown in FIG. 1 by the double arrow, wherein the conclusion of the communication stack processing may also include, for example, according to the invention, a check on the data security or data authenticity particularly if necessary or required.

These data are subsequently forwarded immediately to the application module 5 with a driver assistance system and/or a driving safety system, which suitably further processes the data and instigates the necessary measures. These measures may include, for example, the instigation of automatic braking. Since these applications of the application module 5 relate directly to the safety of the vehicle, the data of these objects must be processed in control devices with a correspondingly high safety level (SIL level). These data are not therefore subjected to a prediction in the preprocessing, but are forwarded as quickly as possible to the correspondingly safe control devices.

The first step of the preprocessing in the reception control unit 2 is therefore restricted to a recognition of the relevance of the data and the fastest possible forwarding of the most relevant data to the final processing application module 5 in order to achieve the lowest possible latency of the data of these relevant objects. Where appropriate, during the sorting of data into the class of relevance 1, an interrupt can even take place in the communication stack processing, so that these data can be further processed immediately in the communication stack and can be forwarded as quickly as possible to the application module 5.

Conversely, the objects in the classes of relevance 2 and 3 are initially further processed in the preprocessing. So as not to burden the computing power of the receiving control device 2 unnecessarily, the further steps of the preprocessing are carried out in the downstream control device 3.

The objects already categorized by the receiving control device 2 into the second class of relevance on the basis of their distance and/or their time-to-collision are allocated immediately to class and are further processed as described below. Conversely, objects not sorted into the second class of relevance 2 are subjected to a further categorization into classes of relevance. For this purpose, the coverage areas of environment sensors of the own vehicle are additionally considered under ideal conditions, which occur in the control device 3 as suitably parameterized information. Objects which, according to their position indications contained in the data, are located in this theoretical coverage area, are additionally categorized into this class 2.

In a further preprocessing in the application module 6, a sensor fusion, for example, can then be carried out if the objects identified in the C2X communication are also detected in environment sensors of the vehicle, for example a radar sensor. As a result, the data processed in the communication system 1 of the vehicle are not only qualitatively improved, but are also condensed in the sense that different information elements are merged into one object. This simplifies and speeds up the further processing in downstream applications, since the multiplicity of individual data elements is reduced.

Furthermore, an attempt can be made in the application module 6 in the preprocessing according to the invention to improve the position accuracy of data for the individual objects in that, for example, the data are compared with other data in the coverage area and/or in that a suitable data filtering takes place. In addition, a dynamic prediction can take place in the preprocessing according to the invention, taking into account map and road information present in the application module and/or a direction evaluation of the individual take place objects in relation to the own vehicle. This enables a simpler tracking (temporal and spatial tracking) of an object for downstream safety devices. Transferred data, such as, for example, a bend in the direction of movement and/or acceleration or deceleration of the object, can also be used here. To conclude the preprocessing in the application module 6 and end the communication stack processing, the data of the objects are made available to a vehicle application module 7 which may also involve, for example, a driver assistance system (which may also be identical to the driver assistance system 5). The application module 7 may also be a location and/or navigation module or any given further application in the vehicle which uses data from the C2X communication.

The class 3 data and/or objects are finally forwarded to a further control device 4 in which a further and concluding preprocessing is carried out by the application module 8. This last step of the preprocessing may consist in abandoning data categorized as completely irrelevant and terminating the processing of the communication stack for these data so as not to consume memory and computing time resources unnecessarily in the control devices 2, 3, 4 and downstream applications. A further application may involve combining groups of objects from which data are in each case present and treating them as one object in order to reduce the data volume. Applications for this purpose have already been explained and can also be found in the driving situations described below with reference to FIG. 2 and FIG. 3. It can be provided according to the invention that no dynamic prediction or sensor fusion is carried out for the objects in the class of relevance 3, because the knowledge gain is not normally worthwhile. However, the information obtained, insofar as it is not rejected, may in any event be forwarded to other applications, for example an application module 9 designed as an infotainment or mobility module.

Since data are typically permanently received, but the individual applications access the data with a certain time loop, the data must, where appropriate, be temporarily stored in the control devices 2, 3, 4 or other memories. For this purpose, it is appropriate to store the data according to classes of relevance and, where appropriate, supplementary priorities, but otherwise chronologically. Where appropriate, the time difference between reception and retrieval can be compensated by means of a short-time prediction, preferably by the downstream application.

The communication system 1 described in FIG. 1 is an example and represents one embodiment. The functions of the individual components described in connection with this embodiment are not restricted to an arrangement of the components in precisely this form and can also be used in modified forms, in each case separately, as a contribution according to the invention.

Figure 2:
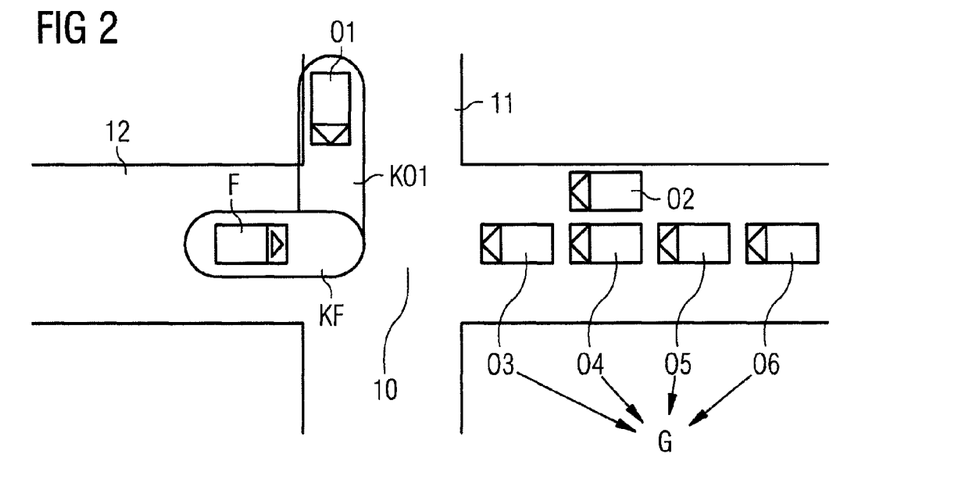
FIG. 2 is a schematic diagram of an example of a traffic situation at an intersection, which is recorded and processed by the method according to the invention.

FIG. 2 shows a traffic situation at an intersection. The own vehicle F and other vehicles or objects O, which are numbered sequentially in the representation for a simple reference, are located on roads 11, 12 shooting at the intersection 10.

The own vehicle F moves on the road 12 toward the intersection 10. The movement range attained within a predefined short time-to-collision is drawn with shading as the collision area KF of the own vehicle. The vehicle O1 moves accordingly on the road 11 toward the intersection 10. The collision area KO1 of the vehicle O1 is similarly drawn with shading. Since these two areas KF and KO1 overlap one another, the time-to-collision for categorizing the object into the first class of relevance 1 is understepped. This object is therefore categorized into the first class of relevance 1 and its data are forwarded immediately to the application module 5 with the driver assistance system.

The vehicle O2 moves on the road 12, but in the opposite direction to the own vehicle F, toward the intersection 10. The corresponding collision areas are not included in the drawing for the sake of clarity. However, due to the movement of the two vehicles, these collision areas also overlap one another within the threshold values applicable to the sorting into the second class of relevance. The object 2 is therefore sorted into the second class of relevance. In the further preprocessing in the control device 3, a dynamic prediction of the object O2 is attempted. Furthermore, if the object O2 is detected by a vehicle environment sensor of the own vehicle, a sensor fusion is carried out. A reliable tracking of the object O2 is thus possible. If the driver of the own vehicle F, indicates, for example, by means of a flashing signal, that he wishes to turn left into the road 11, a warning can be given regarding the vehicle O2 in the oncoming traffic.

The vehicles O3 to O6 are stationary in the oncoming traffic on the road 12, because they wish to turn left into the road 11 and must consider the own vehicle F, which would have priority if driving straight on. Since these vehicles O3 to O6 are stationary due to the traffic conditions, their collision areas do not overlap with the collision area of the own vehicle F for either the first or the second class of relevance. The distance between the own vehicle F and the vehicles O3 to O6 is also so great that the latter are not to be categorized into the class of relevance 2. These objects O3 to O6 are therefore sorted into the class of relevance 3.

In the application unit 8, it is established, through evaluation and comparison of the data of the objects O3 to O6, that these objects O3 to O6 have common characteristics. These objects O3 to O6 are therefore combined as the group G, which is represented in this case in an appropriate manner by the object as the object nearest to the own vehicle. Due to the combination, the data volume to be processed in the communication system 1 of the vehicle can be significantly reduced.

Figure 3:
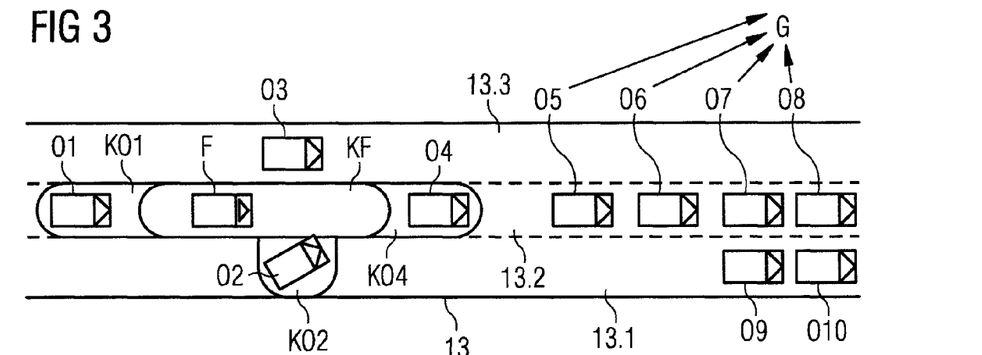
FIG. 3 is a schematic diagram of an example of a traffic situation on a highway, which is recorded and processed by the method according to the invention.

FIG. 3 relates to a traffic situation on a highway 13, of which only one direction of travel is shown with the lanes 13.1, 13.2 and 13.3. The own vehicle F is located in the second lane 13.2. For the own vehicle F, the collision area KF determining the categorization into the first class of relevance is also shown with shading. The vehicles O1 and O4, from which C2X notifications are also received in the communication system 1 of the own vehicle F, are traveling in the same lane 13.2 behind or in front of the own vehicle. The collision areas KO1 and KO4 of the former vehicles are also included accordingly in the drawing. The vehicle O2, which is just executing a lane change into the lane 13.2, is traveling in the lane 13.1, slightly offset in front of the own vehicle F. The collision area KO2 is also included in the drawing for this vehicle O2.

Since the collision areas KO1, KO2, and KO4 overlap with the collision area KF of the own vehicle F, the objects O1, O2 and O4 are sorted into the class of relevance 1. According to the invention, the driver assistance system 5 therefore receives the data of the objects O1, O2 and O4 particularly quickly and can inform the driver as early as possible of the recognized and dangerous lane change of the vehicle O2.

This would essentially also apply to the object O3, which does not, however, participate in the C2X communication and is therefore not taken into account in the method according to the invention.

The vehicles O5, O6, O7, O8, O9 and O10 are located, in relation to the own vehicle F, outside the relevant distance and outside the relevant time-to-collision. These objects O5 to O10 are therefore sorted into the third class of relevance. In a further preprocessing of the application module 8, it is recognized that the vehicles O9 and O10 are traveling in a different lane 13.1. The data of these objects O9 and O10 are therefore categorized as irrelevant and are rejected. For the objects O5 to O8, it is recognized in the preprocessing in the application module 8 that these vehicles are traveling in convoy in the same lane 13.2 as the own vehicle. These vehicles are therefore combined into a group G and their data are represented by the object O5, which is the nearest of the objects O5, O6, O7, O8 of the group G to the own vehicle.

Figure 4:
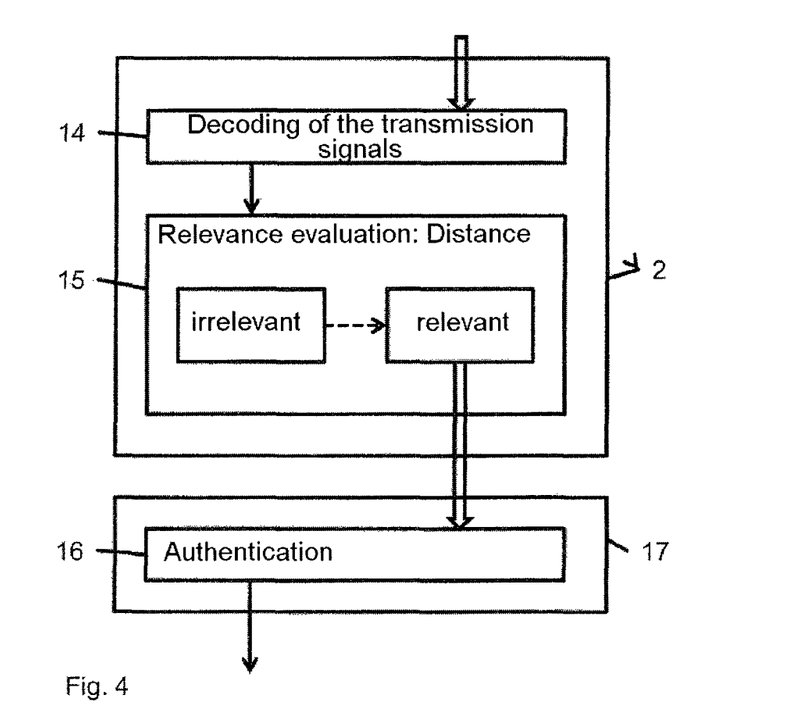
FIG. 4 is a flowchart with the progression of the method according to the invention for data reception in vehicle-to-surroundings communication in a vehicle communication system according to a second embodiment.

FIG. 4, in a schematic flow chart, highlights a further variant of the invention, which can also be combined with the variant described with reference to FIG. 1.

According to FIG. 4, it is provided that, following the reception of the data via the antenna and decoding of the transmission signals 14 in a first step of the communication stack processing, which is indicated by a double arrow, the data are also further evaluated in the receiving control device 2 integrated into the antenna unit (not shown) on the basis of their distance to the own vehicle. Following this relevance evaluation 15, only the relevant data are further processed in downstream control devices and the communication stack is further processed.

For this purpose, a further processing of the communication stack is provided in FIG. 4 through an authentication 16 of the received data. The security of the objects and/or data is therefore checked in a security module 17 only if they have been evaluated as relevant to vehicle safety (e.g., due to a possible risk of collision) or mobility (for example, due to an indication of a tailback).

Conversely, if the objects are not categorized as relevant, they are given the evaluation "Security not checked" or are rejected. This procedure significantly reduces the complexity with which the data authenticity check is normally associated.

Only in a step downstream of the authentication 16 are the data further checked in more detail in application modules and are sorted into data or objects which are highly relevant, critical or medium-relevant, or to be watched. The critical objects are immediately forwarded as described to a corresponding safety application and the objects to be watched are earmarked, where appropriate, for tracking in a next processing pass. This is not shown further in FIG. 4.

Finally, it is possible that the data categorized as irrelevant are nevertheless post-processed, insofar as the processing does not require any resources in terms of memory space or computing time which are required elsewhere. If data not yet authenticated prove to be relevant in a post-processing of this type, these data will be reclassified as relevant and then forwarded to the authentication 16. This is indicated by a dotted arrow within the relevance evaluation 15.

FIG. 4 shows how the communication stack processing and the preprocessing according to the invention of the data received in the C2X communication are interlocked with one another.

Figure 5:
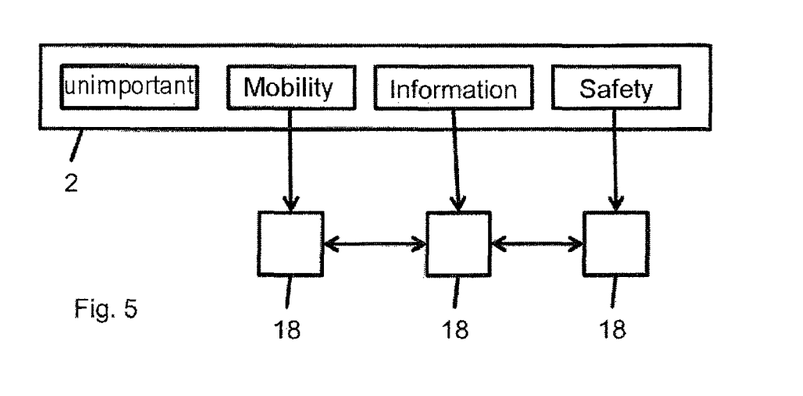
FIG. 5 is a flowchart with the progression of the method according to the invention for data reception in vehicle-to-surroundings communication in a vehicle communication system according to the invention according to a third embodiment.

In a further exemplary embodiment, shown in FIG. 5, and also combinable, where appropriate, with the previous exemplary embodiments, the data received in the C2X communication are divided or sorted into classes of relevance directly on the receiving control device 2, wherein the following class of relevance designations are provided: "unimportant", "relevant to mobility", "relevant to information", "relevant to safety". The data in the unimportant class are not forwarded or further processed. The other data are forwarded to different, downstream control devices 18, wherein, where appropriate, only one downstream control device may also be provided.

This rough classification is used in the downstream control devices 18 to validate the data. In the validation, a check can be carried out to ascertain, inter alia, whether the present data of the objects are consistent with the history of the objects. The validation of the data is controlled here in such a way that safety-critical objects are subjected to more elaborate methods and are analyzed more precisely than mobility-related objects.

The validation can also be carried out in different control devices, which have a corresponding safety level (ASI level) for the data classes, so that safety-critical data are processed in control devices that have a low probability of failure.

If the relevance evaluation of the data changes in the subsequent processing, the data can be fed in each case to the corresponding control devices, as indicated by the double arrows.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data reception in wireless vehicle-to-surroundings communication in a communication system (1) of a vehicle (F) with a plurality of control devices (2, 3, 4, 18), the method comprising:
   receiving, by a receiving control device (2), data from objects (O) in an area surrounding the vehicle (F);
   during the receiving, processing a communication stack;
   sorting, by the receiving control device (2), the received data into at least two different classes of relevance, the relevance classification being performed in the receiving control device (2) without multiple transmission and reception between an object and the vehicle;
   further processing the communication stack depending on the class of relevance from the sorting step; and
   based on the further processing and the class of relevance, controlling action of a driver assistance and/or safety system of the vehicle.

2. The method as claimed in claim 1, wherein the further processing of the received data takes place on different control devices.

3. The method as claimed in claim 1, wherein the received data are allocated to different applications according to the class of relevance.

4. The method as claimed in claim 1, wherein a distance between the object (O) and the vehicle (F) is allocated to the received data of the object (O) and the sorting of the received data from the objects in the area surrounding the vehicle into the classes of relevance is carried out on the basis of the distance.

5. The method as claimed in claim 1, wherein a time-to-collision is allocated to the received data of the object (O) and the sorting of the received data from the objects in the area surrounding the vehicle into the classes of relevance is carried out on the basis of the time-to-collision.

6. The method as claimed in claim 1, wherein the sorting of the received data of the objects (O) in the area surrounding the vehicle is carried out on the basis of overlap with a coverage area of one or more environment sensors of the vehicle (F).

7. The method as claimed in claim 1, wherein a priority is allocated in each case to a class of relevance and the further processing in the communication stack is dependent on this allocated priority.

8. The method as claimed in claim 1, wherein quality of the received data is improved on the basis of data of a different object (O) or of a sensor.

9. The method as claimed in claim 1, further comprising carrying out a dynamic prediction of an object (O) participating in the vehicle-to-surroundings communication.

10. The method as claimed in claim 1, further comprising determining, from the data of an object (O), a trajectory of the object (O) and extrapolating this trajectory.

11. The method as claimed in claim 1, wherein the data of the objects (O) in the area surrounding the vehicle are combined into groups (G).

12. The method as claimed in claim 11, wherein a group (G) is represented by the object (O) with the lowest time-to-collision and/or with the shortest distance to the vehicle (F).

13. The method as claimed in claim 1, wherein three classes of relevance are formed.

14. A communication system for data reception in wireless vehicle-to-surroundings communication between individual communication participants, the communication system (1) being provided in a vehicle (F) and comprising:
- a plurality of different control devices (2, 3, 4, 18); and
- a plurality of computing units each associated with respective one of the plurality of different control devices,
- wherein the computing units of the control devices (2, 3, 4, 18) are configured to carry out the method as claimed in claim 1.

15. A non-transitory computer-readable medium storing computer program code, which, when executed on a computing unit of a control device of a vehicle, causes the control device to carry out the method as claimed claim 1.

16. The method as claimed in claim 1, wherein the controlled action of a driver assistance and/or safety system of the vehicle comprises instigation of automatic braking of the vehicle.

* * * * *